(12) United States Patent
Steele, Jr.

(10) Patent No.: US 7,228,324 B2
(45) Date of Patent: Jun. 5, 2007

(54) CIRCUIT FOR SELECTIVELY PROVIDING MAXIMUM OR MINIMUM OF A PAIR OF FLOATING POINT OPERANDS

(75) Inventor: Guy L. Steele, Jr., Lexington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 785 days.

(21) Appl. No.: 10/035,746

(22) Filed: Dec. 28, 2001

(65) Prior Publication Data

US 2002/0178200 A1 Nov. 28, 2002

Related U.S. Application Data

(60) Provisional application No. 60/293,173, filed on May 25, 2001.

(51) Int. Cl.
G06F 7/00 (2006.01)
G06F 7/38 (2006.01)

(52) U.S. Cl. .................................... 708/207; 708/495

(58) Field of Classification Search ............... 708/207, 708/495; 340/146.2
See application file for complete search history.

(56) References Cited

U.S. PATENT DOCUMENTS 3,725,649 A 4/1973 Deerfield (Continued)

OTHER PUBLICATIONS

U.S. Appl. No. 10/320,547, filed Dec. 17, 2002, Steele, Jr.

(Continued)

*Primary Examiner*—Tan V. Mai
(74) *Attorney, Agent, or Firm*—Finnegan, Henderson, Farabow, Garrett & Dunner, L.L.P.

(57) ABSTRACT

A floating point max/min circuit for determining the maximum or minimum of two floating point operands includes a first analysis circuit configured to determine a format of a first floating point operand of the two floating point operands based upon floating point status information encoded within the first floating point operand, a second analysis circuit configured to determine a format of a second floating point operand of the two floating point operands based upon floating point status information encoded within the second floating point operand, a decision circuit, coupled to the first analysis circuit and to the second analysis circuit and responding to a function control signal that indicates the threshold condition is one of a maximum of the two floating point operands and a minimum of the two floating point operands, for generating at least one assembly control signal based on the format of a first floating point operand, the format of a second floating point operand, and the function control signal, and a result assembler circuit, coupled to the decision circuit, for producing a result indicating which of the first floating point operand and the second floating point operand meet the threshold condition, based on the at least one assembly control signal. The format of the floating point operands may be from a group comprising: not-a-number (NaN), positive infinity, negative infinity, normalized, denormalized, positive overflow, negative overflow, positive underflow, negative underflow, inexact, exact, division by zero, invalid operation, positive zero, and negative zero. The result produced may be a third floating point operand having encoded floating point status information, and at least part of the encoded floating point status information in the result may come from either the first floating point operand or the second floating point operand.

28 Claims, 3 Drawing Sheets

U.S. PATENT DOCUMENTS

| | | | |
|---|---|---|---|
| 4,777,613 A | 10/1988 | Shahan et al. | |
| 4,788,655 A | 11/1988 | Nakayama et al. | |
| 4,991,131 A | 2/1991 | Yeh et al. | |
| 5,065,352 A | 11/1991 | Nakano | |
| 5,126,963 A | 6/1992 | Fukasawa | |
| 5,161,117 A | 11/1992 | Waggener, Jr. | |
| 5,249,149 A | 9/1993 | Cocanougher et al. | |
| 5,307,303 A | 4/1994 | Briggs et al. | |
| 5,347,481 A | 9/1994 | Williams | |
| 5,347,482 A | 9/1994 | Williams | |
| 5,357,237 A | 10/1994 | Bearden et al. | |
| 5,363,321 A | 11/1994 | Dao Trong et al. | |
| 5,365,465 A | 11/1994 | Larson | |
| 5,481,489 A | 1/1996 | Yanagida et al. | |
| 5,570,310 A | 10/1996 | Smith | |
| 5,666,301 A | 9/1997 | Makino | |
| 5,748,516 A | 5/1998 | Goddard et al. | |
| 5,812,439 A | 9/1998 | Hansen | |
| 5,862,066 A | 1/1999 | Rossin et al. | |
| 5,892,697 A | 4/1999 | Brakefield | |
| 5,931,943 A * | 8/1999 | Orup | 712/222 |
| 5,953,241 A | 9/1999 | Hansen et al. | |
| 5,963,461 A | 10/1999 | Gorshtein et al. | |
| 5,978,901 A * | 11/1999 | Luedtke et al. | 708/495 |
| 5,995,991 A | 11/1999 | Huang et al. | |
| 6,009,511 A | 12/1999 | Lynch et al. | 712/222 |
| 6,049,865 A | 4/2000 | Smith | |
| 6,081,823 A | 6/2000 | Purcell et al. | |
| 6,105,047 A | 8/2000 | Sharangpani et al. | |
| 6,108,772 A | 8/2000 | Sharangpani | |
| 6,131,106 A | 10/2000 | Steele, Jr. | |
| 6,138,135 A | 10/2000 | Karp | |
| 6,151,669 A | 11/2000 | Huck et al. | |
| 6,189,094 B1 | 2/2001 | Hinds et al. | |
| 6,205,460 B1 | 3/2001 | Steele, Jr. | |
| 6,219,685 B1 | 4/2001 | Story | |
| 6,256,655 B1 | 7/2001 | Ezer et al. | |
| 6,286,023 B1 | 9/2001 | Purcell et al. | |
| 6,286,024 B1 | 9/2001 | Yano et al. | |
| 6,360,189 B1 | 3/2002 | Hinds et al. | |
| 6,393,555 B1 * | 5/2002 | Meier et al. | 712/222 |
| 6,490,607 B1 | 12/2002 | Oberman | |
| 6,571,265 B1 | 5/2003 | Story | |
| 6,594,681 B1 | 7/2003 | Prabhu | |
| 6,629,120 B1 | 9/2003 | Walster et al. | |
| 6,658,443 B1 | 12/2003 | Walster | |
| 6,658,444 B1 | 12/2003 | Walster et al. | |
| 6,697,832 B1 | 2/2004 | Kelley et al. | |
| 6,732,134 B1 | 5/2004 | Rosenberg et al. | |
| 6,789,098 B1 * | 9/2004 | Dijkstra | 708/495 |
| 2002/0194232 A1 | 12/2002 | Walster | |
| 2003/0033335 A1 | 2/2003 | Walster | |

OTHER PUBLICATIONS

U.S. Appl. No. 10/320,450, filed Dec. 17, 2002, Steele, Jr.
U.S. Appl. No. 10/028,375, filed Dec. 28, 2001, Steele, Jr.
U.S. Appl. No. 10/035,579, filed Dec. 28, 2001, Steele, Jr.
U.S. Appl. No. 10/035,580, filed Dec. 28, 2001, Steele, Jr.
U.S. Appl. No. 10/035,581, filed Dec. 28, 2001, Steele, Jr.
U.S. Appl. No. 10/035,582, filed Dec. 28, 2001, Steele, Jr.
U.S. Appl. No. 10/035,583, filed Dec. 28, 2001, Steele, Jr.
U.S. Appl. No. 10/035,584, filed Dec. 28, 2001, Steele, Jr.
U.S. Appl. No. 10/035,585, filed Dec. 28, 2001, Steele, Jr.
U.S. Appl. No. 10/035,586, filed Dec. 28, 2001, Steele, Jr.
U.S. Appl. No. 10/035,587, filed Dec. 28, 2001, Steele, Jr.
U.S. Appl. No. 10/035,589, filed Dec. 28, 2001, Steele, Jr.
U.S. Appl. No. 10/035,595, filed Dec. 28, 2001, Steele, Jr.
U.S. Appl. No. 10/035,647, filed Dec. 28, 2001, Steele, Jr.
U.S. Appl. No. 10/035,674, filed Dec. 28, 2001, Steele, Jr.
U.S. Appl. No. 10/035,741, filed Dec. 28, 2001, Steele, Jr.
U.S. Appl. No. 10/035,747, filed Dec. 28, 2001, Steele, Jr.
U.S. Appl. No. 10/036,133, filed Dec. 28, 2001, Steele, Jr.
Title: "Safe Treatment of Overflow and Underflow Conditions", by Robert A. Fraley & J. Stephen Walther, Hewlett-Packard Co., pp. 1-5.
Title: "Vax Floating Point: A Solid Foundation for Numerical Computation", by Mary Payne & Dileep Bhandarkar, Digital Equipment Corp., pp. 1-12.
Title: Lecture Notes on the Status of "IEEE Standard 754 for Binary Floating-Point Arithmetic", by Prof. W. Kahan, May 31, 1996, pp. 1-30.
Title: "Interval Arithmetic Specification" by Dmitri Chiriaev & G. William Walster, Draft revised May 4, 1998, pp. 1-78.
Title: "IEEE Standard for Binary Floating-Point Arithmetic IEEE Standard 754-1985," by Standards Committee of the IEEE Computer Society, The Institute of Electrical and Electronics Engineers, Inc., copyright 1985, pp. 1-14.

\* cited by examiner

| Value | s | e... | f... |
|---|---|---|---|
| $+\infty$ | 0 | 1 1 1... | 0 0 0... |
| $-\infty$ | 1 | 1 1 1... | 0 0 0... |
| NaN | X | 1 1 1... | Not(0 0 0...) |
| $+0$ | 0 | 0 0 0... | 0 0 0... |
| $-0$ | 1 | 0 0 0... | 0 0 0... |
| $(-1)^s 2^{e\text{-bias}}(1.|f...)$ | X | Not(0 0 0...) and Not(1 1 1...) | X |
| $(-1)^s 2^{e\text{-bias}+1}(0.|f...)$ | X | 0 0 0... | Not(0 0 0...) |

X = Don't Care

CIRCUIT FOR SELECTIVELY PROVIDING MAXIMUM OR MINIMUM OF A PAIR OF FLOATING POINT OPERANDS

Applicant claims the right of priority based on U.S. Provisional Patent Application Ser. No. 60/293,173 filed May 25, 2001 in the name of Guy L. Steele, Jr.

INCORPORATION BY REFERENCE

Related U.S. patent application Ser. No. 10/035,747, filed on even date herewith in the name of Guy L. Steele Jr. and entitled "Floating Point System That Represents Status Flag Information Within A Floating Point Operand," assigned to the assignee of the present application, is hereby incorporated by reference.

FIELD OF THE INVENTION

The invention relates generally to systems and methods for performing floating point operations, and more particularly to systems and methods for selectively providing the maximum or minimum of a pair of floating point operands.

BACKGROUND OF THE INVENTION

Digital electronic devices, such as digital computers, calculators, and other devices, perform arithmetic calculations on values in integer, or "fixed point," format, in fractional, or "floating point" format, or both. IEEE Standard 754, (hereinafter "IEEE Std. 754" or "the Standard") published in 1985 by the Institute of Electrical and Electronic Engineers, and adopted by the American National Standards Institute (ANSI), defines several standard formats for expressing values in floating point format, and a number of aspects regarding behavior of computation in connection therewith. In accordance with IEEE Std. 754, a representation in floating point format comprises a plurality of binary digits, or "bits," having the structure:

$$se_{msb} \ldots e_{lsb}f_{msb} \ldots f_{lsb}$$

where bit "s" is a sign bit indicating whether the entire value is positive or negative, bits "$e_{msb} \ldots e_{lsb}$" comprise an exponent field representing the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprisi fraction field.

As indicated above, the exponent field of the floating point representation "$e_{msb} \ldots e_{lsb}$ represents the exponent "E" in biased format. The biased format provides a mechanism by which the sign of the exponent is implicitly indicated. In particular, the bits $e_{msb} \ldots e_{lsb}$" represent a binary encoded value "e" such that "e=E+bias." This allows the exponent E to extend from −126 to +127, in the eight-bit "single" format, and from −1022 to +1023 in the eleven-bit "double" format, and provides for relatively easy manipulation of the exponents in multiplication and division operations, in which the exponents are added and subtracted, respectively.

IEEE Std. 754 provides for several different formats with both the single and double formats, which are generally based on the bit patterns of the bits "$e_{msb} \ldots e_{lsb}$" comprising the exponent field and the bits $f_{msb} \ldots f_{lsb}$ comprising the fraction field. For example, as shown in prior art FIG. 3, if a number is represented such that all of the bits "$e_{msb} \ldots e_{lsb}$" of the exponent field are binary one's (that is, if the bits represent a binary-encoded value of "255" in the single format or "2047" in the double format) and all of the bits "$f_{msb} \ldots f_{lsb}$ of the fraction field are binary zeros, then the value of the number is positive infinity 310 or negative infinity 320, depending on the value of the sign bit "s"; in particular, the value "v" is $v=(-1)^s\infty$ where "∞" represents the value "infinity." On the other hand, if all of the bits "$e_{msb} \ldots e_{lsb}$" of the exponent field are binary one's and if the bits "$f_{msb} \ldots f_{lsb}$ of the fraction field are not all zeros, then the value that is represented is deemed "not a number," 330 abbreviated in the Standard by "NaN."

If a number has an exponent field in which the bits "$e_{msb} \ldots e_{lsb}$" are neither all binary ones nor all binary zeros (that is, if the bits represent a binary-encoded value between 1 and 254 in the single format or between 1 and 2046 in the double format), the number is said to be in a "normalized" format 360. For a number in the normalized format, the value represented by the number is $v=(-1)^s 2^{e-bias}$ $(1.1f_{msb} \ldots f_{lsb})$ where "1" represents a concatenation operation. Effectively, in the normalized format, there is an implicit most significant digit having the value "one," so that the twenty-three digits in the fraction field of the single format, or the fifty-two digits in the fraction field of the double format, will effectively represent a value having twenty-four digits or fifty-three digits of precision, respectively, where the value is less than two, but not less than one.

On the other hand, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are not all zero, the number is said to be in a "de-normalized" format 370. For a number in the de-normalized format, the value represented by the number is $v=(-1)^s 2^{e-bias+1}$ $(0.1f_{msb} \ldots f_{lsb})$. It will be appreciated that the range of values of numbers that can be expressed in the de-normalized format is disjoint from the range of values of numbers that can be expressed in the normalized format, for both the single and double formats. Finally, if a number has an exponent field in which the bits "$e_{msb} \ldots e_{lsb}$" are all binary zeros, representing the binary-encoded value of "zero," and a fraction field in which the bits $f_{msb} \ldots f_{lsb}$ are all zero, the number has the value "zero." It will be appreciated that the value "zero" may be positive zero 340 or negative zero 350, depending on the value of the sign bit.

Generally, floating point units to perform computations whose results conform to IEEE Std. 754 are designed to generate a result in response to a floating point instruction in three steps:

(a) First, an approximation calculation step in which an approximation to the absolutely accurate mathematical result (assuming that the input operands represent the specific mathematical values as described by IEEE Std. 754) is calculated. This calculation is sufficiently precise as to allow this accurate mathematical result to be summarized by a sign bit, an exponent (typically represented using more bits than are used for an exponent in the standard floating-point format), and some number "N" of bits of the presumed result fraction, plus a guard bit and a sticky bit. The value of the exponent will be such that the value of the fraction generated in step (a) consists of a 1 before the binary point and a fraction after the binary point. The bits are calculated so as to obtain the same result as the following conceptual procedure (which is impossible under some circumstances to carry out in practice): calculate the mathematical result to an infinite number of bits of precision in binary scientific notation, and in such a way that there is no bit position in the significand such that all bits of lesser significance are 1-bits (this restriction avoids the ambiguity between, for example, 1.100000 . . . and 1.011111 . . . as representations of the value "one-and-one-half"); then let the N most significant bits of the infinite significand be used as the intermediate result significand, let the next bit of the infinite significand be the guard bit, and let the sticky bit be 0 if and only if ALL remaining bits of the infinite significand are O-bits (in other words, the sticky bit is the logical OR of all remaining bits of the infinite fraction after the guard bit).

(b) Second, a rounding step, in which the guard bit, the sticky bit, perhaps the sign bit, and perhaps some of the bits of the presumed significand generated in step (a) are used to decide whether to alter the result of step (a). For the rounding modes defined by IEEE Std. 754, this is a decision as to whether to increase the magnitude of the number represented by the presumed exponent and fraction generated in step (a). Increasing the magnitude of the number is done by adding 1 to the significand in its least significant bit position, as if the significand were a binary integer. It will be appreciated that, if the significand is all 1-bits, then the magnitude of the number is "increased" by changing it to a high-order 1-bit followed by all 0-bits and adding 1 to the exponent. It will be further appreciated that,
  (i) if the result is a positive number, and
    (a) if the decision is made to increase, effectively the decision has been made to increase the value of the result, thereby rounding the result up (that is, towards positive infinity), but
    (b) if the decision is made not to increase, effectively the decision has been made to decrease the value of the result, thereby rounding the result down (that is, towards negative infinity); and
  (ii) if the result is a negative number, and
    (a) if the decision is made to increase, effectively the decision has been made to decrease the value of the result, thereby rounding the result down, but
    (b) if the decision is made not to increase, effectively the decision has been made to increase the value of the result, thereby rounding the result up.
(c) Finally, a packaging step, in which the result is packaged into a standard floating-point format. This may involve substituting a special representation, such as the representation defined for infinity or NaN if an exceptional situation (such as overflow, underflow, or an invalid operation) was detected. Alternatively, this may involve removing the leading 1-bit (if any) of the fraction, because such leading 1-bits are implicit in the standard format. As another alternative, this may involve shifting the fraction in order to construct a denormalized number. As a specific example, we assume that this is the step that forces the result to be a NaN if any input operand is a NaN. In this step, the decision is also made as to whether the result should be an infinity. It will be appreciated that, if the result is to be a NaN or infinity, any result from step (b) will be discarded and instead the appropriate representation will be provided as the result.

In addition in the packaging step, floating-point status information is generated, which is stored in a floating point status register. The floating point status information generated for a particular floating point operation includes indications, for example, as to whether:

(i) a particular operand is invalid for the operation to be performed ("invalid operation");

(ii) if the operation to be performed is division, the divisor is zero ("division-by-zero");

(iii) an overflow occurred during the operation ("overflow");

(iv) an underflow occurred during the operation ("underflow"); and (v) the rounded result of the operation is not exact ("inexact").

These conditions are typically represented by flags that are stored in the floating point status register, separate from the floating point operand. The floating point status information can be used to dynamically control the operations in response to certain instructions, such as conditional branch, conditional move, and conditional trap instructions that may be in the instruction stream subsequent to the floating point instruction. Also, the floating point status information may enable processing of a trap sequence, which will interrupt the normal flow of program execution. In addition, the floating point status information may be used to affect certain ones of the functional unit control signals that control the rounding mode. IEEE Std. 754 also provides for accumulating floating generated for a series or plurality of floating point operations.

IEEE Std. 754 has brought relative harmony and stability to floating-point computation and architectural design of floating-point units. Moreover, its design was based on some important principles, and rests on a sensible mathematical semantics that eases the job of programmers and numerical analysts. It also supports the implementation of interval arithmetic, which may prove to be preferable to simple scalar arithmetic for many tasks. Nevertheless, IEEE Std. 754 has some serious drawbacks, including:

(i) Modes, which include the rounding mode and may also include a traps enabled/disabled mode, flags representing the floating point status information that is stored in the floating point status register, and traps that are required to implement IEEE Std. 754 introduce implicit serialization between floating-point instructions, and between floating point instructions and the instructions that read and write the flags and modes. Rounding modes can introduce implicit serialization because they are typically indicated as a global state, although in some microprocessor architectures, the rounding mode is encoded as part of the instruction operation code, which alleviates this problem to that extent. Implicit serialization makes the Standard difficult to implement coherently in today's superscalar and parallel microprocessor architectures without loss of performance.

Implicit serialization occurs when programmers and designers try to avoid the problems caused if every floating point instructions uses, and can change, the same floating point status register. This can create problems if, for example, two instructions are executing in parallel in a microprocessor architectures featuring several CPUs running at once and both cause an update of the floating point status register. In such a case, the contents of the status register would likely be incorrect with respect to at least one of the instructions, because the other parallel instruction will have written over the original contents. Similar problems can occur in scalar processor architectures, in which several instructions are issued and processed at once. To solve this problem, programmers and designers make sure that floating point instructions that can affect the floating point status register are executed in serial fashion, one instruction completing before another begins.

(ii) The implicit side effects of a procedure that can change the flags or modes can make it very difficult for compilers to perform optimizations on floating-point code. To be safe, compilers for most languages assume that every procedure call is an optimization barrier.

(iii) Global flags, such as those that signal certain modes, make it more difficult to do instruction scheduling where the best performance is provided by interleaving instructions of unrelated computations. Instructions from regions of code governed by different flag settings or different flag detection requirements cannot easily be interleaved when they must share a single set of global flag bits.

(iv) Traps have been difficult to integrate efficiently into architectures and programming language designs for fine-grained control of algorithmic behavior.

A further problem arises in connection with functional units that selectively provide the maximum or minimum of a pair of floating point operands, in response to respective maximum and minimum instructions therefor. Existing functional units make use of the "obvious" maximum/minimum definition in the C programming language. For example, the "obvious" definition for "maximum" in the C programming language is:

define max(x,y)((x)>(y))?((x):(y)

which provides operand "x" if the value of operand "x" is greater than the value of operand "y." Otherwise, the "obvious" definition for "maximum" in C provides operand "y." It will be appreciated that, if the value of operand "x" is the same as the value of operand "y," operand "y" will be provided. "Minimum" is defined analogously. These definitions have at least four shortcomings:

(a) they do not correctly produce a NaN result when operand x is a NaN value and operand y is not a NaN value;

(b) when the value of operand "x" is +0 and the value of operand "y" is −0, it produces the result −0, whereas +0 is usually the more desirable answer, especially when computing bounds for interval arithmetic;

(c) it fails to be commutative and associative;

(d) because of shortcomings (a) and (b), maximum and the analogously defined minimum fail to obey such mathematical identities as:

(i) max(−x,−y)=−min(x,y);
(ii) min(−x,−y)=−max(x,y);
(iii) max(min(x,y),min(x,z))=min(x,max(y,z)); and
(iv) min(max(x,y),max(x,z))=max(x,min(y,z)).

U.S. patent application Ser. No. 10/035,747, filed on even date herewith in the name of Guy L. Steele Jr. and entitled "Floating Point System That Represents Status Flag Information Within A Floating Point Operand," describes a floating point unit in which floating point status information is encoded in the representations of the results generated thereby. By encoding the floating point status information relating to a floating point operation in the result that is generated for the operation, the implicit serialization required by maintaining the floating point status information separate and apart therefrom can be obviated. In one embodiment, the floating point unit includes a plurality of functional units, including an adder unit, a multiplier unit, a divider unit, a square root unit, a maximum/minimum unit, a comparator unit and a tester unit, all of which operate under control of functional unit control signals provided by a control unit. The instant application is directed to a maximum/minimum unit that can be used in the floating point unit described in that application and that has the advantage of avoiding the problems exhibited by existing functional units that make use of the "obvious" maximum/minimum definition in the C programming language described above.

SUMMARY OF THE INVENTION

Embodiments consistent with the principles of the invention provide new and improved systems and methods for performing floating point operations, and more particularly, systems and methods for selectively providing the maximum or minimum of a pair of floating point operands in which flags representative of floating point status comprise a portion of the representation of the result.

In brief summary, systems consistent with the principles of the present invention provide a floating point max/min circuit for determining the maximum or minimum of two floating point operands, including a first analysis circuit configured to determine a format of a first floating point operand of the two floating point operands based upon floating point status information encoded within the first floating point operand, a second analysis circuit configured to determine a format of a second floating point operand of the two floating point operands based upon floating point status information encoded within the second floating point operand, a decision circuit, coupled to the first analysis circuit and to the second analysis circuit and responding to a function control signal that indicates the threshold condition is one of a maximum of the two floating point operands and a minimum of the two floating point operands, for generating at least one assembly control signal based on the format of a first floating point operand, the format of a second floating point operand, and the function control signal, and a result assembler circuit, coupled to the decision circuit, for producing a result indicating which of the first floating point operand and the second floating point operand meet the threshold condition, based on the at least one assembly control signal. The format of the floating point operands may be from a group comprising: not-a-number (NaN), positive infinity, negative infinity, normalized, denormalized, positive overflow, negative overflow, positive underflow, negative underflow, inexact, exact, division by zero, invalid operation, positive zero, and negative zero. The result produced may be a third floating point operand having encoded floating point status information, and at least part of the encoded floating point status information in the result may come from either the first floating point operand or the second floating point operand.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 3 depicts prior art formats for representing floating point values.

DETAILED DESCRIPTION OF AN ILLUSTRATIVE EMBODIMENT

Figure 1:
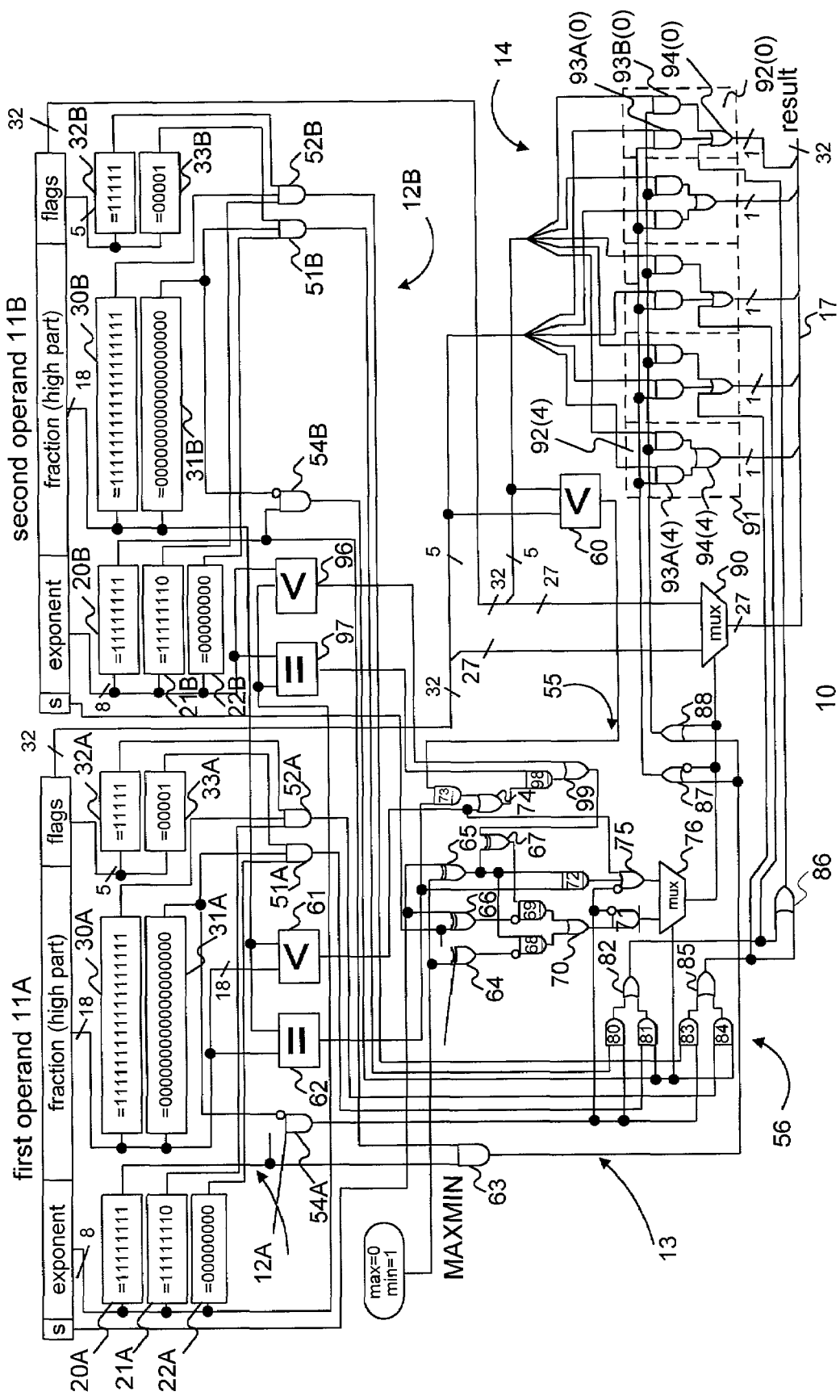
FIG. 1 is a functional block diagram of an exemplary maximum/minimum unit constructed in accordance with an embodiment of the invention.

FIG. 1 is a functional block diagram of an exemplary maximum/minimum unit 10 constructed in accordance with an embodiment of the invention. Generally, the maximum/minimum unit 10 receives two floating point operands and generates therefrom a result as the maximum or minimum of the two operands. In addition, in some cases, the maximum/minimum unit 10 generates floating point status information, with the floating point status information being encoded in and comprising part of the floating point operand representation of the result. Since the floating point status information comprises part of the floating point representation of the result, instead of being separate and apart from the result as in prior art remainder units, the implicit serialization that is required by maintaining the floating point status information separate and apart from the result can be obviated.

Figure 2:
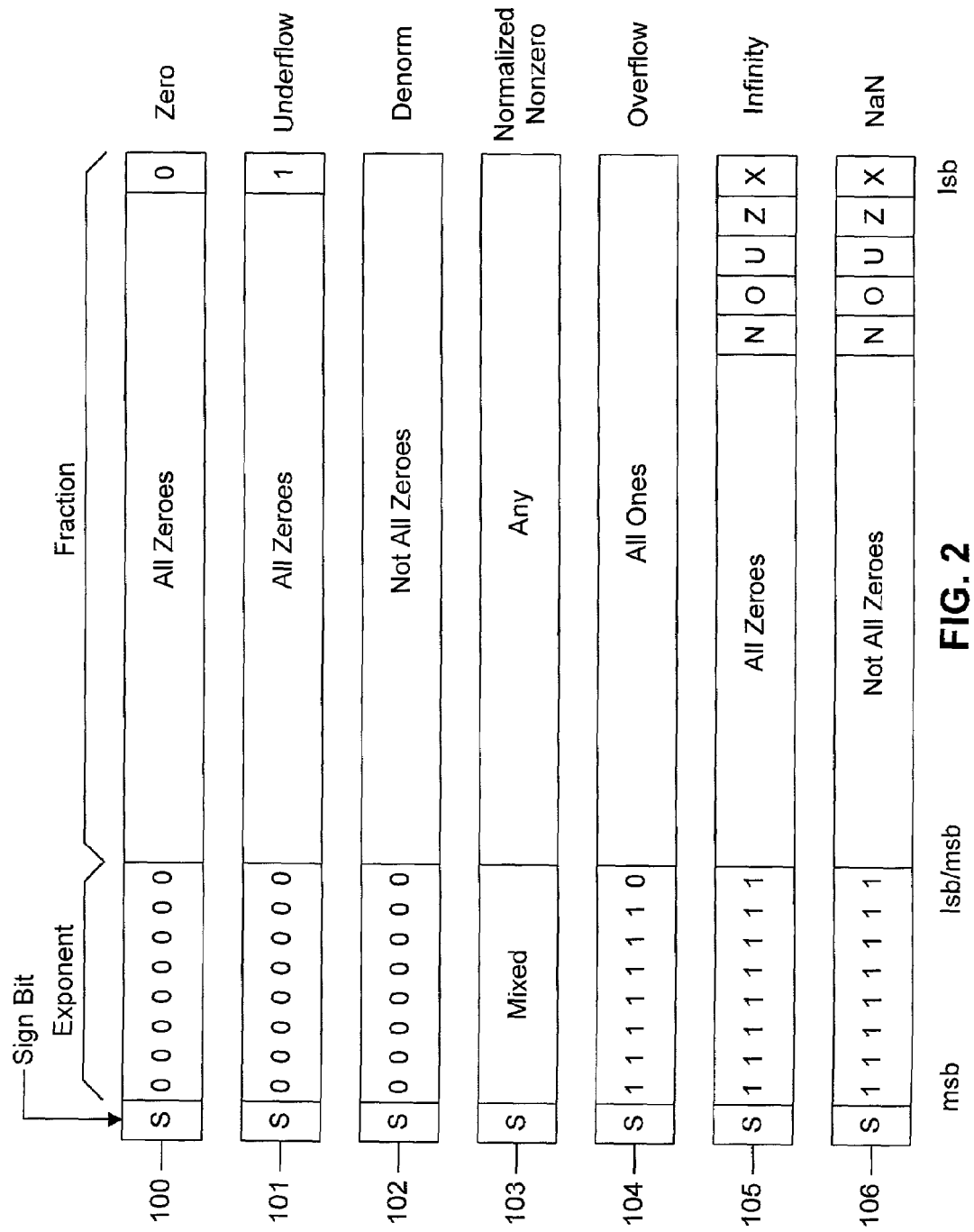
FIG. 2 depicts formats for exemplary representations of floating point values generated by the maximum/minimum unit depicted in FIG. 1 and in accordance with an embodiment of the invention.

The maximum/minimum unit 10 encodes the floating point status information in results that are generated in certain formats. This will be illustrated in connection with FIG. 2. FIG. 2 depicts exemplary formats of floating point operands that the floating point maximum/minimum circuit 10 may receive, and of results that it generates. With reference to FIG. 2, seven exemplary formats are depicted, including a zero format 100, an underflow format 101, a denormalized format 102, a normalized non-zero format 103, an overflow format 104, an infinity format 105 and a not-a-number (NaN) format 106. The exemplary zero format 100 is used to represent the values "zero," or, more specifically, positive or negative zero, depending on the value of "s," the sign bit.

The exemplary underflow format 101 provides a mechanism by which the floating point maximum/minimum circuit 10 can indicate that the result of a computation is an underflow. In the underflow format of the illustrated embodiment, the sign bit "s" indicates whether the result is positive or negative, the bits $e_{msb} \ldots e_{lsb}$ of the exponent field are all binary zeros, and the bits $f_{msb} \ldots f_{lsb+1}$ of the fraction field are all binary zeros. The least significant bit $f_{lsb}$ of the fraction field is a binary one.

The exemplary denormalized format 102 and exemplary normalized non-zero format 103 are used to represent finite non-zero floating point values substantially along the lines of that described above in connection with IEEE Std. 754. In both formats 102 and 103 of the illustrated embodiment, the sign bit "s" indicates whether the result is positive or negative. The bits $e_{msb} \ldots e_{lsb}$ of the exponent field of the denormalized format 102 are all binary zeros, whereas the bits $e_{msb} \ldots e_{lsb}$ of the exponent field of the normalized non-zero format 103 are mixed ones and zeros, except that the exponent field of the normalized non-zero format 103 will not have a pattern in which bits $e_{msb} \ldots e_{lsb+1}$ are all binary ones and the least significant bit $e_{lsb}$ is zero and all of the bits $f_{msb} \ldots f_{lsb}$ of the fraction field are all binary ones (see overflow format 104). In format 102, the bits $f_{msb} \ldots f_{lsb}$ of the fraction field are not all binary zeros.

The exemplary overflow format 104 provides a mechanism by which the floating point maximum/minimum circuit 10 can indicate that the result of a computation is an overflow. In the overflow format 104 of the illustrated embodiment, the sign bit "s" indicates whether the result is positive or negative, the bits $e_{msb} \ldots e_{lsb+1}$ of the exponent field are all binary ones, with the least significant bit $e_{lsb}$ being zero. The bits $f_{msb} \ldots f_{lsb}$ of the fraction field are all binary ones.

The exemplary infinity format 105 provides a mechanism by which the floating point maximum/minimum circuit 10 can indicate that the result is infinite. In the infinity format 105 of the illustrated embodiment, the sign bit "s" indicates whether the result is positive or negative, the bits $e_{msb} \ldots e_{lsb}$ of the exponent field are all binary ones, and the bits $f_{msb} \ldots f_{lsb+5}$ of the fraction field are all binary zeros. The five least significant bits $f_{lsb+4} \ldots f_{lsb}$ of the fraction field are flags, which will be described below.

The exemplary NaN (not-a-number) format 106 provides a mechanism by which the floating point maximum/minimum circuit 10 can indicate that the result is not a number. In the NaN format of the illustrated embodiment, the sign bit "s" can be any value, the bits $e_{msb} \ldots e_{lsb}$ of the exponent field are all binary ones, and the bits $f_{msb} \ldots f_{lsb+5}$ of the fraction field are not all binary zeros. The five least significant bits $f_{lsb+4} \ldots f_{lsb}$ of the fraction field are flags, which will be described below.

As noted above, in values represented in the infinity format 105 and the NaN format 106, the five low order bits $f_{lsb+4} \ldots f_{lsb}$ of the fraction field are flags. In the formats used with the floating point maximum/minimum circuit 10, the five flags include the flags that are defined by IEEE Std. 754, including an invalid operation flag "n," an overflow flag "o," an underflow flag "u," a division-by-zero flag "z," and an inexact flag "x." For example, a value in the NaN format 106 in which both the overflow flag "o" and the division-by-zero flag "z" are set indicates that the value represents a result of a computation that involved an overflow (this from the overflow flag "o"), as well as an attempt to divide by zero (this from the division-by-zero flag "z"). It should be noted that the flags provide the same status information as provided by, for example, information stored in a floating point status register in a prior art floating point unit. However, since the information is provided as part of the result and stored therewith in registers in which the result is ultimately stored, multiple instructions can be contemporaneously executed. This may be accomplished because the floating point status information generated during execution of one instruction, when stored, will not over-write previously-stored floating point status information generated during execution of another instruction. In addition, in one embodiment, values in the other formats can be indicated as being inexact based in part on the least-significant bit $f_{lsb}$ of their fraction fields, and in that embodiment bit operates as an inexact flag. The value will be indicated as being inexact if the bit $f_{lsb}$ has the value "one," and otherwise exact.

One of ordinary skill in the art will recognize that the other formats and bit patterns could be used to represent the floating point operand formats without departing from the principles of the present invention. One of ordinary skill in the art will also recognize that the floating point status information contained in the operands could easily be represented by other unillustrated bit combinations without departing from the principles of the present invention. For example, more or fewer bits could be used to represent the information, a subset or superset of the exemplary status bits could be used, or the most significant bits of an operand (or some other subset of bits) could be used to indicate the floating point status information instead of the least significant bits illustrated.

With this background, the structure and operation of the exemplary maximum/minimum unit 10 will be described in connection with FIG. 1 consistent with an embodiment of the present invention. With reference to FIG. 1, one embodiment of maximum/minimum unit 10 includes two operand buffers 11A and 11B, respective operand analysis circuits 12A and 12B, a decision circuit 13 and a result assembler 14. The operand buffers 11A and 11B receive and store respective operands from, for example, a set of registers (not shown) in a conventional manner. Each operand analysis circuit 12A, 12B analyzes the operand in the respective operand buffer 11A, 11B and generates signals providing information relating to the respective operands. These signals are provided to the decision circuit 13 and essentially provide information as to the type of the respective operand. In particular, these signals may indicate whether the operand is in the underflow format 101, the overflow format 104, or the NaN format 106.

The decision circuit 13 receives the signals from the operand analysis circuits 12A, 12B. The decision circuit 13 also receives a control signal indicating whether the maximum/minimum unit 10 is to perform a maximum operation or a minimum operation and signals from both operand buffers 11A and 11B. Decision circuit 13 generates signals that control the result assembler 14 in assembling the result. The result assembler 14 receives the contents of the operand buffers 11A, 11B and, under control of signals from the decision circuit 13, assembles the result, which is coupled onto a result bus 17. The result bus 17, in turn, may deliver the result to any convenient destination, such as a register in a register set (not shown), for storage or other use.

Before proceeding to a detailed description of the operand analysis circuits 12A, 12B, decision circuit 13, and result assembler 14, it would be helpful to describe the result that will be generated by the shown embodiment of maximum/minimum unit 10 from the operands in operand buffers 11A, 11B. Generally, if either operand is in the NaN format 106, the result will also be in the NaN format 106. If both operands are in the NaN format 106, the bits $f_{msb} \ldots f_{lsb+5}$ of the fraction field of the result will correspond to the bits $f_{msb} \ldots f_{lsb+5}$ of the fraction field of the operand for which the corresponding bits have the higher binary-encoded value. If both operands are in either the NaN format 106 or the infinity format 105, the bits $f_{lsb+4} \ldots f_{lsb}$ of the fraction field of both operands, which correspond to the flags "n," "o," "u," "z" and "x," contribute to the corresponding bits of the results. If one operand is in the NaN format 106 and the other operand is in the underflow format 101 or the overflow format 104, the result will correspond to the operand that is in the NaN format, with the appropriate bit $f_{lsb+2}$ (which corresponds to the underflow flag "u") or bit $f_{lsb+3}$ (which corresponds to the overflow flag "o") and bit $f_{lsb}$ (which corresponds to the inexact flag "x") of the fraction field of the result being set. If neither operand is in the NaN format, the result corresponds to the respective maximum or minimum of the two operands, depending on whether the maximum/minimum unit 10 is to perform a maximum operation or a minimum operation.

In contrast to conventional maximum/minimum units, maximum/minimum unit 10 produces a NaN result if operand x is a NaN value and operand y is not a NaN value; produces the result positive zero (+0) if the value of operand "x" is +0 and the value of operand "y" is negative zero (−0); and produces a result that obeys the well-known commutative and associative laws of arithmetic for any given values of "x" and "y."

More specifically, except as noted below at (ii) in connection with the bits $f_{lsb+4} \ldots f_{lsb}$ of the fraction field, the exemplary maximum/minimum unit 10 in the illustrated embodiment provides:

(i) as the result, the operand in operand buffer 11B if and only if
(1) EITHER
(2) (a) the operand in operand buffer 11B is in the NaN format 106
(3) AND
(4) EITHER
(5) (I) the operand in operand buffer 11A is not in the NaN format 106
(6) OR
(7) (II) the binary-encoded value of the bits $f_{msb} \ldots f_{lsb+5}$ of the fraction field of the operation in operand buffer 11A is less than the binary-encoded value of the bits $f_{msb} \ldots f_{lsb+5}$ of the fraction field of the operation in operand buffer 11B,
(8) OR
(9) (III) BOTH
(10) (1) the binary-encoded value of the bits $f_{msb} \ldots f_{lsb+5}$ of the fraction field of the operation in operand buffer 11A equals the binary-encoded value of the bits $f_{msb} \ldots f_{lsb+5}$ of the fraction field of the operation in operand buffer 11B
(11) AND
(12) (2) the sign bit of the operand in operand buffer 11A does not equal MAXMIN (an indicator that is negated if the maximum/minimum unit 10 is to perform a maximum operation and asserted if the maximum/minimum unit 10 is to perform a minimum operation),
(13) OR
(14) (b) ALL THREE OF
(15) (I) the operand in operand buffer 11B is not in the NaN format 106
(16) AND
(17) (II) the operand in operand buffer 11A is not in the NaN format 106
(18) AND
(19) (III) EITHER
(20) (1) the sign bit of the operand in operand buffer 11A does not equal MAXMIN and the sign bit of the operand in operand buffer 11B does equal MAXMIN
(21) OR
(22) (2) the sign bit of the operand in operand buffer 11A equals the sign bit of the operand in operand buffer 11B, and exactly one of the following is true:
(24) (A) the sign bit of the operand in operand buffer 11A does not equal MAXMIN
(25) EXCLUSIVE-OR
(28) (B) the magnitude of the operand in operand buffer 11A is less than the magnitude of the operand in operand buffer 11B.

Otherwise, the maximum/minimum unit 10 provides the operand in operand buffer 11A as the result.

(ii) The five bits $f_{lsb+4} \ldots f_{lsb}$ of the fraction field of the operand that is not provided in accordance with (i) above are ORed into the bits $f_{lsb+4} \ldots f_{lsb}$ of the result if and only if
(29) BOTH
(30) (a) the exponent field of the operand in operand buffer 11A has the bit pattern 11111111
(31) AND
(32) (b) the exponent field of the operand in operand buffer 11B has the bit pattern 11111111,
which will be the case if both operands are in either the infinity format 105 or the NaN format 106.

(iii) Bit $f_{lsb+3}$ of the result, which corresponds to the overflow flag "o," will be set if
(33) EITHER
(34) (a) BOTH
(35) (I) the operand in operand buffer 11A is in the NaN format
(36) AND
(37) (II) the operand in operand buffer 11B is +OV or −OV (that is, a positive or negative value in the overflow format 104)

(38) OR
(39) (b) BOTH
(40) (I) the operand in operand buffer 11A is +OV or −OV
(41) AND
(42) (II) the operand in operand buffer 11B is in the NaN format 106.

(iv) Bit $f_{lsb+2}$ of the result, which corresponds to the underflow flag "u," will be set if
(43) EITHER
(44) (a) BOTH
(45) (I) the operand in operand buffer 11A is in the NaN format 106
(46) AND
(47) (II) the operand in operand buffer 11B is +UN or −UN (that is, a positive or negative value in the underflow format 101)
(48) OR
(49) (b) BOTH
(50) (I) the operand in operand buffer 11A is +UN or −UN
(51) AND
(52) (II) the operand in operand buffer 11B is in the NaN format 106.

(v) Bit $f_{lsb}$ of the result, which corresponds to the inexact flag, will be set if
(53) EITHER
(54) (a) BOTH
(55) (I) the operand in operand buffer 11A is in the NaN format 106
(56) AND
(57) (II) the operand in operand buffer 11B is +UN or −UN or +OV or −OV
(58) OR
(59) (b) BOTH
(60) (I) the operand in operand buffer 11A is +UN or −UN or +OV or −OV
(61) AND
(62) (II) the operand in operand buffer 11B is in the NaN format 106.

It will be appreciated that item (v) corresponds to the logical OR of items (iii) and (iv).

One of ordinary skill in the art will recognize that the relationships and results described in (1) through (62) to produce the maximum or minimum result can easily be changed without departing from the principles of the present invention. For example, the floating point status flags, such as bit $f_{lsb}$ of the result, may be set or cleared for different conditions in addition to those described above.

With this background, as noted above, each exemplary operand analysis circuit 12A, 12B analyzes the operand in the respective buffer 11A, 11B and generates signals providing information relating thereto, which signals are provided to the decision circuit 13. In one embodiment, each exemplary operand analysis circuit 12A, 12B, comprises a number of comparators, including:

(i) a comparator 20A, 20B that generates an asserted signal if the bits $e_{msb} \ldots e_{lsb}$ of the exponent field of the operand in respective buffer 11A, 11B are all binary ones, which will be the case if the operand is in the infinity format 105 or the NaN format 106;

(ii) a comparator 21A, 21B that generates an asserted signal if the bits $e_{msb} \ldots e_{lsb+1}$ of the exponent field of the operand in the respective buffer 11A, 11B are all binary ones, and the bit $e_{lsb}$ is a binary zero, which will be the case if the operand is in the overflow format 104 and may be the case if the operand is in the normalized format 103;

(iii) a comparator 22A, 22B that generates an asserted signal if the bit $e_{msb} \ldots e_{lsb}$ of the exponent field of the operand in respective buffer 11A, 11B are all binary zeros, which will be the case if the operand is in the zero format 100, underflow format 101, or denormalized format 102;

(iv) a comparator 30A, 30B that generates an asserted signal if the bits $f_{msb} \ldots f_{lsb+5}$ of the fraction field of the operand in the respective buffer 11A, 11B are all binary ones, which may be the case if the operand is in the denormalized format 102, normalized nonzero format 103, overflow format 104, or NaN format 106;

(v) a comparator 31A, 31B that generates an asserted signal if the bits $f_{msb} \ldots f_{lsb+5}$ of the fraction field of the operand in the respective buffer 11A, 11B are all binary zeros, which may be the case if the operand is in the zero format 100, underflow format 102, denormalized format 102, normalized non-zero format 103 or infinity format 105;

(vi) a comparator 32A, 32B that generates an asserted signal if the bits $f_{lsb+4} \ldots f_{lsb}$ of the fraction field of the operand in the respective buffer 11A, 11B are all binary ones, which may be the case if the operand is in the denormalized format 102 or normalized non-zero format 103, and which will be the case if the operand is in the overflow format 104, or if all of the flags "n," "o," "u," "z," and "x" are set in the infinity format 105 or NaN format 106; and (vii) a comparator 33A, 33B that generates an asserted signal if the bits $f_{lsb+4} \ldots f_{lsb+1}$ of the fraction field of the operand in the respective buffer 11A, 11B are binary zeros, and if the bit $f_{lsb}$ of the fraction field is a binary one. This will be the case if the operand is in the underflow format 101. This may also be the case if the operand is in the denormalized format 102, normalized non-zero format 103, or if the flags "n," "o," "u," and "z" are clear and the flag "x" is set in either the infinity format 105 or NaN format 106.

Each exemplary operand analysis circuit 12A, 12B also includes combinatorial logic elements that receive selected ones of the signals from the comparators and generate asserted signals to provide indications as to certain characteristics of the respective operand. In the illustrated embodiment, this logic includes:

(viii) an AND gate 51A, 51B, which will generate an asserted signal if comparator 22A, 22B, comparator 31A, 31B, and comparator 33A, 33B, are all generating asserted signals, which will be the case if the operand in the respective operand buffer 11A, 11B is in the underflow format 61;

(ix) an AND gate 52A, 52B, which will generate an asserted signal if comparator 21A, 21B, comparator 30A, 30B, and comparator 32A, 32B, are all generating asserted signals, which will be the case if the operand in the respective operand buffer 11A, 11B is in the overflow format 104; and (x) an NAND gate 54A, 54B, which will generate an asserted signal if comparator 20A, 20B is generating an asserted signal and comparator 31A, 31B is generating a negated signal, which will be the case if the operand in the respective operand buffer 11A, 11B is in the NaN format 106.

The exemplary decision circuit 13 receives signals from the operand analysis circuits 12A, 12B, and a function control signal indicating whether the maximum/minimum unit 10 is to detect a threshold condition by performing a maximum operation or a minimum operation. Decision circuit 13 also receives signals from both operand buffers 11A and 11B and generates signals that control the result assembler 14 in assembling the result. The exemplary decision circuit 13 essentially comprises two portions, namely, an operand selector portion 55 and a flag conditioning portion 56. Generally, the operand selector portion 55 generates a signal that controls the result assembler 14 to selectively couple portions of the operand in one of the operand buffers 11A or 11B to the result bus 17, in particular, the sign bit, the bits $e_{msb} \ldots e_{lsb}$ comprising the exponent field and bits $f_{msb} \ldots f_{lsb+5}$ of the fraction field of the respective operand. The operand selector portion 55 operates in accordance with items (1) through (28) above. The flag conditioning portion 56 generates signals that control the result assembler 14 in assembling the bits $f_{lsb+4} \ldots f_{lsb}$ of the fraction field from the corresponding bits of one or both operands in operand buffers 11A and 11B, and that also can enable the result assembler to force the bits $f_{lsb+3}$, $f_{lsb+2}$ and $f_{lsb}$ to particular values. The flag conditioning portion 56 operates in accordance with items (29) through (62) above.

In the embodiment illustrated in FIG. 1, the operand selector portion 55 itself comprises two sections, which share some components. In particular, the operand selector portion sections 55 share comparators that are used in determining the relative magnitudes of the binary-encoded values of the fraction portions of the operands in the respective operand buffers. One section of the operand selector portion 55 operates in accordance with items (2) through (12) above, and the other section operates in accordance with items (14) through (28). Accordingly, if the operand in operand buffer 11B is in the NaN format 106, the section that operates in accordance with items (2) through (12) will provide the control signal to control the result assembler 14. On the other hand, if the operand in operand buffer 11B is not in the NaN format 106, the section that operates in accordance with items (14) through (28) will provide the control signal to control the result assembler 14.

More specifically, the exemplary operand selector portion 55 includes:

(xi) a comparator 60, which will generate an asserted signal if the binary-encoded value of the bits $f_{lsb+4} \ldots f_{lsb}$ of the fraction field of the operand in operand buffer 11B is greater than the binary-encoded value of the bits $f_{lsb+4} \ldots f_{lsb}$ of the fraction field of the operand in operand buffer 11A;

(xii) a comparator 61, which will generate an asserted signal if the binary-encoded value of the bits $f_{msb} \ldots f_{lsb+5}$ of the fraction field of the operand in operand buffer 11B is greater than the binary-encoded value of the bits $f_{msb} \ldots f_{lsb+5}$ of the fraction field of the operand in operand buffer 11A;

(xiii) a comparator 62, which will generate an asserted signal if the binary-encoded value of the bits $f_{msb} \ldots f_{lsb+5}$ of the fraction field of the operand in operand buffer 11B is equal to the binary-encoded value of the bits $f_{msb} \ldots f_{lsb+5}$ of the fraction field of the operand in operand buffer 11A;

(xiv) a comparator 96 that will generate an asserted signal if the binary-encoded value of the bits $e_{msb} \ldots e_{lsb}$ of the exponent field of the operand in buffer 11B is greater than the binary-encoded value of the bits $e_{msb} \ldots e_{lsb}$ of the exponent field of the operand in buffer 11A; and (xv) a comparator 97 that will generate an asserted signal if the binary-encoded value of the bits $e_{msb} \ldots e_{lsb}$ of the exponent field of the operand in buffer 11B is equal to the binary-encoded value of the bits $e_{msb} \ldots e_{lsb}$ of the exponent field of the operand in buffer 11A.

The following components comprise the section of the exemplary operand selector portion 55 that operates in accordance with items (14) through (28) above:

(xvi) an XOR gate 64 (reference item (24) above), which will generate a negated signal if (a) the MAXMIN maximum/minimum control signal indication is negated, indicating that the maximum/minimum unit 10 is to perform a maximum operation, and a signal representing the sign bit of the operand in operand buffer 11B is negated indicating that the operand in operand buffer 11B is positive; or (b) the MAXMIN maximum/minimum control signal indication is asserted, indicating that the maximum/minimum unit 10 is to perform a minimum operation, and a signal representing the sign bit of the operand in operand buffer 11B is asserted indicating that the operand in operand buffer 111B is negative;

(xvii) an XOR gate 65 (reference items (20) and (26) above), which will generate an asserted signal if:

(a) the MAXMIN maximum/minimum control signal indication is negated, indicating that the maximum/minimum unit 10 is to perform a maximum operation, and a signal representative of the sign bit of the operand in operand buffer 11A is asserted indicating that the operand in operand buffer 11A is negative; or (b) the MAXMIN maximum/minimum control signal indication is asserted, indicating that the maximum/minimum unit 10 is to perform a minimum operation, and a signal representative of the sign bit of the operand in operand buffer 11A is negated indicating that the operand in operand buffer 11A is positive;

XOR gate 65 will generate a negated signal if:

(a) the MAXMIN maximum/minimum control signal indication is asserted, indicating that the maximum/minimum unit 10 is to perform a minimum operation, and a signal representative of the sign bit of the operand in operand buffer 11A is asserted indicating that the operand in operand buffer 11A is negative; or (b) the MAXMIN maximum/minimum control signal indication is negated, indicating that the maximum/minimum unit 10 is to perform a maximum operation, and a signal representative of the sign bit of the operand in operand buffer 11A is negated indicating that the operand in operand buffer 11A is positive;

(xviii) an XOR gate 66 (reference item (24) above), which will generate an asserted signal if signals from the operand buffers 11A and 11B representative of the sign bits of the respective operands indicate that the operands are of opposite sign, and a negated signal if the signals indicate that the operands are of the same sign;

(xix) an AND gate 73 that generates an asserted signal, if the comparators 60 and 62 are both generating asserted signals, which will be the case if the binary-encoded values of the bits $f_{msb} \ldots f_{lsb+5}$ of the fraction field in operand buffers 11A and B are the same, and the binary-encoded value of the bits $f_{lsb+4} \ldots f_{lsb}$ of the fraction field of the operand in buffer 11B is greater than the value of the corresponding bits in buffer 11A;

(xx) an OR gate 74 that generates an asserted signal if either comparator 61 or AND gate 73 is generating an asserted signal, which will be the case if the binary-encoded value of the bits $f_{msb} \ldots f_{lsb}$ of the fraction field of the operand in buffer 11B is greater than the binary-encoded value of the corresponding bits in buffer 11A; in effect, gates 73 and 74 combine the outputs of comparators 60, 61, and 62 to make a 23-bit comparator;

(xxi) an AND gate 98 that generates an asserted signal if the comparator 97 and the OR gate 74 are both generating asserted signals, which will be the case if the value in the exponent field in buffer 11B is equal to the value in the exponent field in buffer 11A, and the value in the fraction field of buffer 11B is greater than the value in the fraction field of buffer 11A;

(xxii) an OR gate 99 that generates an asserted signal if either comparator 96 or AND gate 98 is generating an asserted signal, which will be the case if either the value in the exponent field in buffer 11B is greater than the value in the exponent field in buffer 11A, or if the two exponent fields are equal but the fraction field value in buffer 11B is greater than the corresponding value in buffer 11A;

OR gate 99 generates a negated signal if both comparator 96 and AND gate 98 are generating negated signals, which will be the case if the value in the exponent field in buffer 11B is not greater than the value in the exponent field in buffer 11A and either the two exponent fields are not equal or the fraction field value in buffer 11B is not greater than the corresponding value in buffer 11A, in effect gates 73, 74, 98, and 99 combine the outputs of comparators 60, 61, 62, 96, and 97 to make a 31-bit comparator;

(xxiii) an XOR gate 67 (reference items (25) through (28) above), which generates an asserted signal if OR gate 99 is generating an asserted signal (as explained in (xxii)) and XOR gate 65 is generating a negated signal (as explained in (xvii)), and which generates an asserted signal if OR gate 99 is generating a negated signal (as explained in (xxii)) and XOR gate 65 is generating an asserted signal (as explained in xvii);

(xxiv) a NAND gate 68 (reference item (20) through (22) above), which generates an asserted signal if the XOR gate 64 is generating a negated signal and XOR gate 65 is generating an asserted signal;

(xxv) a NAND gate 69 (reference items (24) through (28) above), which generates an asserted signal if XOR gate 66 is generating a negated signal and XOR gate 67 is generating an asserted signal;

(xxvi) an OR gate 70 (reference items (19) through (28) above, particularly referencing item (23)) which generates an asserted signal if either NAND gate 68 or NAND gate 69 is generating an asserted signal; and (xxvii) a NAND gate 71 (reference items (17) through (28), particularly referencing item (18)), which generates an asserted signal if the OR gate 70 is generating an asserted signal and NAND gate 54A is generating a negated signal indicating that the operand in operand buffer 11A is not in the NaN format 106.

The following components comprise the section of the exemplary operand selector portion 55 that operates in accordance with items (2) through (12) above:

(xxviii) an AND gate 72 (reference items (9) through (12) above), which generates an asserted signal if the comparator 62 and XOR gate 65 are both generating asserted signals, which will be the case if (a) the bits $f_{msb} \ldots f_{lsb+5}$ of the fraction fields of the operands in operand buffers 11A and 11B have the same binary-encoded value (reference item (10) above), and (b) either (reference item (12) above)

(I) the maximum/minimum unit 10 is to perform a maximum operation and the operand in operand buffer 11A is negative; or (II) the maximum/minimum unit 10 is to perform a minimum operation and the operand in operand buffer 11A is positive;

(xxix) a NOR gate 75 (reference items (4) through (12) above), which generates an asserted signal if the signal from either AND gate 72 or comparator 61 is asserted, or if the signal generated by NAND gate 54A is negated indicating that the operand buffer 11A is not in the NaN format 106;

(xxx) a multiplexer 76 (reference item (1) above), which selectively couples the signal generated by NAND gate 71 or NOR gate 75 to control the result assembler 14 in response to the signal from NAND gate 54B. Generally, the multiplexer 76 couples the signal generated by the NAND gate 71 if the signal generated by NAND gate 54B is negated, which will be the case if the operand in operand buffer 11B is not in the NaN format 106, and the multiplexer 76 couples the signal generated by the NOR gate 75 if the signal generated by NAND gate 54B is asserted, which will be the case if the operand in operand buffer 11B is in the NaN format 106. As will be described below, the result assembler 14 will couple at least a portion of the operand from operand buffer 11A to the result bus 17 if the signal provided by multiplexer 76 is negated, and at least a portion of the operand from operand buffer 11B to the result bus 17 if the signal provided by multiplexer 76 is asserted.

The exemplary flag conditioning portion 56 includes:

(xxxi) an AND gate 63 (reference items (29) through (32)), which will generate an asserted signal if the comparators 20A and 20B are both generating asserted signals, which will be the case if the operands in both operand buffers 11A and 11B are in either the infinity format 105 or the NaN format 106;

(xxxii) an AND gate 80 (reference items (45) through (47) above), which will generate an asserted signal if the NAND gate 54A and AND gate 51B are both generating asserted signals, which will be the case if the operand in operand buffer 11A is in the NaN format 106 and the operand in operand buffer 11B is in the underflow format 101;

(xxxiii) an AND gate 81 (reference items (50) through (52) above), which will generate an asserted signal if the NAND gate 54B and AND gate 51A are both generating asserted signals, which will be the case if the operand in operand buffer 11B is in the NaN format 106 and the operand in operand buffer 11A is in the underflow format 101;

(xxxiv) an OR gate 82 (reference item (44) through (52), and specifically item (48) above), which will generate an asserted signal if either AND gate 81 or AND gate 82 is generating an asserted signal;

(xxxv) an AND gate 83 (reference items (35) through (37) above), which will generate an asserted signal if the NAND gate 54A and AND gate 52B are both generating asserted signals, which will be the case if the operand in operand buffer 11A is in the NaN format 106 and the operand in operand buffer 11B is in the overflow format 104;

(xxxvi) an AND gate 84 (reference items (40) through (42) above), which will generate an asserted signal if the NAND gate 54B and AND gate 52A are both generating asserted signals, which will be the case if the operand in operand buffer 11B is in the NaN format 106 and the operand in operand buffer 11A is in the overflow format 104;

(xxxvii) an OR gate 85 (reference item (35) through (42), and specifically item (38) above), which will generate an asserted signal if either AND gate 83 or AND gate 84 is generating an asserted signal;

(xxxviii) an OR gate 86 (reference items (53) through (62) above), which will generate an asserted signal if either OR gate 82 or OR gate 85 is generating an asserted signal;

(xxxix) a NOR gate 87, which will generate an asserted signal if the AND gate 63 is generating an asserted signal or if the multiplexer 76 is coupling a negated signal; and (xl) an OR gate 88, which will generate an asserted signal if the AND gate 63 is generating an asserted signal or if the multiplexer 76 is coupling an asserted signal.

Generally, elements 80 through 86 (items (xxxii) through (xxxviii) above) of the flag conditioning portion 56 control the forcing of ones of bits $f_{lsb+3}$, $f_{lsb+2}$ or $f_{lsb}$ of the fraction field of the result, comprising the overflow, underflow and inexact flags "o," "u" and "x" to predetermined values. The NOR gate 87 and OR gate 88 control the contribution of bits $f_{lsb+4} \ldots f_{lsb}$ of the fraction fields of the operands in operand buffers 11A and 11B, respectively, to the corresponding bits $f_{lsb+4} \ldots f_{lsb}$ of the fraction field of the result. In particular, if the AND gate 63 is generating an asserted signal, which will be the case if the operands in both operand buffers 11A and 11B are in either the infinity format 105 or the NaN format 106, the NOR gate 87 and OR gate 88 will enable the bits $f_{lsb+4} \ldots f_{lsb}$ of the fraction fields of the operands in both operand buffers 11A and 11B to contribute to bits $f_{lsb+4} \ldots f_{lsb}$ of the fraction field of the result.

On the other hand, if the AND gate 63 is generating a negated signal, which will be the case if the operand in at least one of the operands in operand buffers 11A and 11B is not in either the infinity format 105 or the NaN format 106, and if the multiplexer 76 is generating a negated signal, then NOR gate 87 will enable the result assembler 14 to enable bits $f_{lsb+4} \ldots f_{lsb}$ of the operand in operand buffer 11A to contribute to bits $f_{lsb+4} \ldots f_{lsb}$ of the result. However, if the multiplexer 76 is generating an asserted signal, OR gate 88 will enable the result assembler 14 to enable bits $f_{lsb+4} \ldots f_{lsb}$ of the operand in operand buffer 11B to contribute to bits $f_{lsb+4} \ldots f_{lsb}$ of the result. As noted above, the signal provided by multiplexer 76 also controls coupling of the remaining portions of one of the operands in operand buffer 11A or 11B to the result bus 17.

The exemplary result assembler 14 receives the contents of the operand buffers 11A and 11B and, under control of control signals from the decision circuit 13, assembles the result, which is coupled to a result bus 17. In the illustrated embodiment, the result bus 17, in turn, may deliver the result to any convenient destination, such as a register in a register set (not shown), for storage or other use. The result assembler 14 includes a multiplexer 90 and a combiner 91. The multiplexer 90, under control of the signal provided by multiplexer 76, selectively couples signals representing the sign bit, bits $e_{msb} \ldots e_{lsb}$ comprising the exponent field, and bits $f_{msb} \ldots f_{lsb+5}$ of the fraction field of the operand in one of the operand buffers 11A or 11B to the result bus 17 as the respective sign, bits $e_{msb} \ldots e_{lsb}$ comprising the exponent field and bits $f_{msb} \ldots f_{lsb+5}$ of the fraction field of the result. In particular, if the signal provided by multiplexer 76 is asserted, multiplexer 90 couples signals representing the sign bit, bits $e_{msb} \ldots e_{lsb}$ comprising the exponent field, and bits $f_{msb} \ldots f_{lsb+5}$ of the fraction field of the operand in operand buffer 11B to the result bus 17 as the respective sign, bits $e_{msb} \ldots e_{lsb}$ comprising the exponent field and bits $f_{msb} \ldots f_{lsb+5}$ of the fraction field of the result. On the other hand, if the signal provided by multiplexer 76 is negated, multiplexer 90 couples signals representing the sign bit, bits $e_{msb} \ldots e_{lsb}$ comprising the exponent field, and bits $f_{msb} \ldots f_{lsb+5}$ of the fraction field of the operand in operand buffer 11A to the result bus 17 as the respective sign, bits $e_{msb} \ldots e_{lsb}$ comprising the exponent field and bits $f_{msb} \ldots f_{lsb+5}$ of the fraction field of the result.

The combiner 91 receives signals representing bits $f_{lsb+4} \ldots f_{lsb}$ of the operands in operand buffers 11A and 11B, and signals from OR gates 82, 85 and 86, and couples signals representing bits $f_{lsb+4} \ldots f_{lsb}$ of the result onto result bus 17. If the signal from AND gate 63 is asserted, which will be the case if the operands in both operand buffers 11A and 11B are in the infinity format 105 or NaN format 106, signals from both the NOR gate 87 and OR gate 88 will be asserted to enable the combiner 91 to, in turn, enable signals representing bits $f_{lsb+4} \ldots f_{lsb}$ from both operand buffers 11A and 11B to contribute to bits $f_{lsb+4} \ldots f_{lsb}$ of the result. On the other hand, if the signal from AND gate 63 is negated, the signal provided by multiplexer 76 will control the combiner 91. That is, if the signal provided by multiplexer 76 is asserted, combiner 91 enables bits $f_{lsb+4} \ldots f_{lsb}$ of the fraction field of the operand in operand buffer 11B to contribute to bits $f_{lsb+4} \ldots f_{lsb}$ of the fraction field of the result. In addition, if the signal provided by multiplexer 76 is negated, combiner 91 enables bits $f_{lsb+4} \ldots f_{lsb}$ of the fraction field of the operand in operand buffer 11A to contribute to bits $f_{lsb+4} \ldots f_{lsb}$ of the fraction field of the result. In any case, the combiner 91 enables the signals from OR gates 82, 85 and 86 to contribute to bits $f_{lsb+3}$, $f_{lsb+2}$ and $f_{lsb}$ of the result.

The combiner 91 comprises a plurality of combiner sections 92(0) through 92(4) (generally identified by reference numeral 92(n)), each of which receives signals representative of the bits $f_{lsb+n}$ from the fraction fields of the operands in both operand buffers 11A and 11B, and the signals from NOR gate 87 and OR gate 88. If the signal from NOR gate 87 is asserted, each combiner section 92(n) enables the signal representative of bit $f_{lsb+n}$ from the fraction field of the operand in operand buffer 11A to contribute to the result, and if the signal from OR gate 88 is asserted, each combiner section 92(n) enables the signal representative of bit $f_{lsb+n}$ from the fraction field of the operand in operand buffer 11B to contribute to the result. In addition, combiner sections 92(3), 92(2) and 92(0) receive the signals from respective OR gates 82, 85 and 86, which always contribute to the result.

Each combiner section 92(n) includes two AND gates 93A(n) and 93B(n) and an OR gate 94(n). The AND gate 93A(n) receives the signal from NOR gate 87 and a signal from operand buffer 11A representative of the bit $f_{lsb+n}$ of the fraction field of the operand buffered therein, and, if both signals are asserted, couples an asserted signal to one input of OR gate 94(n). It will be appreciated that NOR gate 87 may be providing an asserted signal either if the operands in both operand buffers 11A and 11B are in either the infinity format 105 or the NaN format 106, or if the signal from multiplexer 76 is enabling the multiplexer 90 to couple signals representative of the sign bit, bits $e_{msb} \ldots e_{lsb}$ comprising the exponent field and bits $f_{msb} \ldots f_{lsb+5}$ of the fraction field of the operand in operand buffer 11A to the result bus 17. Similarly, the AND gate 93B(n) receives the signal from OR gate 88 and a signal from operand buffer 11B representative of the bit $f_{lsb+n}$ of the fraction field of the operand buffered therein, and, if both signals are asserted, couples an asserted signal to another input of OR gate 94(n). It will be appreciated that OR gate 88 may be providing an asserted signal either if the operands in both operand buffers 11A and 11B are in either the infinity format 105 or the NaN format 106, or if the signal from multiplexer 76 is enabling the multiplexer 90 to couple signals representative of the sign bit, bits $e_{msb} \ldots e_{lsb}$ comprising the exponent field and bits $f_{msb} \ldots f_{lsb+5}$ of the fraction field of the operand in operand buffer 11B to the result bus 17.

Thus, if the operands in both operand buffers 11A and 11B are in either the infinity format 105 or the NaN format 106, both AND gates 93A(n) and 93B(n) will be coupling signals representative of the bits $f_{lsb+n}$ in the respective operand buffers 11A and 11B to the OR gate 94(n). It will be appreciated that, in that case, the bits will be representative of respective flags "n," "o," "u," "z," or "x." On the other hand, if at most one operand in operand buffer 11A or 11B is in either the infinity format 105 or the NaN format 106, only one of AND gate 93A(n) or 93B(n) will be coupling a signal representative of the bits $f_{lsb+n}$ in the respective operand buffer 11A or 11B to the OR gate 94(n), in which case the bits may be representative of respective flags "n," "o," "u," "z" or "x" or ones of the least significant bits of the fraction field of the respective operand.

Each OR gate 94(n) receives the signals from respective AND gates 93A(n) and 93B(n), and, in the case of OR gates 94(3), 94(2) and 94(0), signals from OR gates 85, 82 and 86, and generates therefrom a signal representative of bit $f_{lsb+n}$ of the fraction field of the result, which it couples to the result bus 17.

One of ordinary skill in the art will recognize that the relationships between the operands specified in the preceding description to produce the maximum/minimum result can easily be altered without departing from the principles of the present invention. For example, the relationships may be redesigned so that the generated max/min result is in the overflow format if one input operand is in the infinity format and the other input operand is in the overflow format, instead of generating an infinity format result as specified above.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

Those skilled in the art will appreciate that the invention may be practiced in an electrical circuit comprising discrete electronic elements, packaged or integrated electronic chips containing logic gates, a circuit utilizing a microprocessor, or on a single chip containing electronic elements or microprocessors. It may also be provided using other technologies capable of performing logical operations such as, for example, AND, OR, and NOT, including but not limited to mechanical, optical, fluidic, and quantum technologies. In addition, the invention may be practiced within a general purpose computer or in any other circuits or systems as are known by those skilled in the art.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed is:

1. A floating point max/min circuit for determining a threshold condition between two floating point operands, comprising:
    a first analysis circuit configured to determine a format of a first floating point operand of the two floating point operands based upon floating point status information encoded within the first floating point operand;
    a second analysis circuit configured to determine a format of a second floating point operand of the two floating point operands based upon floating point status information encoded within the second floating point operand;
    a decision circuit, coupled to the first analysis circuit and to the second analysis circuit and responding to a function control signal that indicates the threshold condition is one of a maximum of the two floating point operands and a minimum of the two floating point operands, for generating at least one assembly control signal based on the format of a first floating point operand, the format of a second floating point operand, and the function control signal; and
    a result assembler circuit, coupled to the decision circuit, for producing a result indicating which of the first floating point operand and the second floating point operand meet the threshold condition, based on the at least one assembly control signal.

2. The floating point max/min circuit of claim 1 further comprising:
    a first operand buffer coupled to the first analysis circuit, the first operand buffer supplying the first floating point operand to the first analysis circuit; and
    a second operand buffer coupled to the second analysis circuit, the second operand buffer supplying the second floating point operand to the second analysis circuit.

3. The floating point max/min circuit of claim 1, wherein the format is from a group comprising: not-a-number (NaN), positive infinity, negative infinity, normalized, denormalized, positive overflow, negative overflow, positive underflow, negative underflow, inexact, exact, division by zero, invalid operation, positive zero, and negative zero,
    wherein the normalized and denormalized formats indicate a finite numerical value.

4. The floating point max/min circuit of claim 3, wherein the decision circuit treats the first floating point operand as less than the second floating point operand if the format of the first floating point indicates positive overflow and the format of the second floating point operand indicates positive infinity, and
    wherein the decision circuit treats the first floating point operand as greater than the second floating point operand if the format of the first floating point indicates positive overflow and the format of the second floating point operand indicates a finite numerical value.

5. The floating point max/min circuit of claim 3, wherein the decision circuit treats the first floating point operand as greater than the second floating point operand if the format of the first floating point indicates negative overflow and the format of the second floating point operand indicates negative infinity, and
    wherein the decision circuit treats the first floating point operand as less than the second floating point operand if the format of the first floating point indicates negative overflow and the format of the second floating point operand indicates a finite numerical value.

6. The floating point max/min circuit of claim 3, wherein the decision circuit treats the first floating point operand as greater than a second floating point operand if the format of the first floating point indicates positive underflow and the format of the second floating point operand indicates positive zero, and
    wherein the decision circuit treats the first floating point operand as less than a second floating point operand if the format of the first floating point indicates positive underflow and the format of the second floating point operand indicates a positive finite numerical value.

7. The floating point max/min circuit of claim 3, wherein the decision circuit treats the first floating point operand as less than the second floating point operand if the format of the first floating point indicates negative overflow and the format of the second floating point operand indicates negative zero, and wherein the decision circuit treats the first floating point operand as greater than the second floating point operand if the format of the first floating point indicates negative underflow and the format of the second floating point operand indicates a negative finite numerical value.

8. The floating point max/min circuit of claim 3, wherein the floating point max/min circuit obeys a commutative law of arithmetic when the format of at least one of the two floating point operands indicates non-a-number (NaN).

9. The floating point max/min circuit of claim 3, wherein the floating point max/min circuit obeys an associative law of arithmetic when the format of at least one of the two floating point operands indicates not-a-number (NaN).

10. The floating point max/min circuit of claim 3, wherein if the status of at least one of the two floating point operands indicates not-a-number (NaN), then the decision circuit obeys the identities:

$$\max(-x,-y)=-\min(x,y)$$

and $$\min(-x,-y)=-\max(x,y);$$

wherein x represents a value of first floating point operand and y represents a value of the second floating point operand, and wherein the negation operation "–x" complements the sign bit of x.

11. The floating point max/min circuit of claim 3, wherein if the format of at least one of the floating point operands indicates not-a-number (NaN0, then the decision circuit obeys the identities:

$$\max(\min(x,y), \min(x,z))=\min(x,\max(y,z)), \text{ and}$$

$$\min(\max(x,y), \max(x,z))=\max(x,\min(y,z));$$

wherein x represents a value of the first floating point operand, y represents a first value of the second floating point operand, and z represents a second value of the second floating point operand.

12. The floating point max/min circuit of claim 3, wherein if the respective formats of the two floating point operands indicate not-a-number (NaN), then the decision circuit dynamically determines which of the two NaN floating point operands to represent in the result.

13. The floating point max/min circuit of claim 3, wherein if the respective formats of the two floating point operands indicate not-a-number (NaN), then the floating-point max/min circuit produces the result using the floating point status information from the one of the two floating point operands having a larger fraction.

14. The floating point max/min circuit of claim 3, wherein the result is a third floating point operand having encoded floating point status information.

15. The floating point max/min circuit of claim 14, wherein at least part of the encoded floating point status information in the result comes from at least one of: the first floating point operand and the second floating point operand.

16. The floating point max/min circuit of claim 14, wherein the encoded floating point status information in the result further comprises overflow status information if the encoded floating point status information of one of the two floating point operands indicates overflow status and the encoded floating point status information of the other of the two floating point operands indicates at least one of: an infinity status and a NaN status.

17. The floating point max/min circuit of claim 14, wherein the encoded floating point status information in the result further comprises underflow status information if the second floating point status information of one of the two floating point operands indicates underflow status and the encoded floating point status information of the other of the two floating point operands indicates at least one of: an infinity status and a NaN status.

18. The floating point max/min circuit of claim 14, wherein the encoded floating point status information in the result further comprises inexact status information if the encoded floating point status information of one of the two floating point operands indicates overflow status and the encoded floating point status information of the other of the two floating point operands indicates at least one of: an infinity status and a NaN status.

19. The floating point max/min circuit of claim 14, wherein the encoded floating point status information in the result further comprises inexact status information if the encoded floating point status information of one of the two floating point operands indicates underflow status and the encoded floating point status information of the other of the two floating point operands indicates at least one of: an infinity status and a NaN status.

20. The floating point max/min circuit of claim 14, wherein if the format of the first floating point operand indicates NaN and the format of the second floating point operand indicates infinity, then the result produced is in the NaN format and contains floating point status information that is a combination of the floating point status information encoded within the first floating point operand and the floating point status information encoded within the second floating point operand.

21. The floating point max/min circuit of claim 14, wherein if the format of the first floating point operand indicates NaN and the format of the second floating point operand indicates overflow, then the result produced is in the NaN format and contains floating point status information that is a combination of the floating point status information encoded within the first floating point operand and overflow status information.

22. The floating point max/min circuit of claim 14, wherein if the format of the first floating point operand indicates NaN and the format of the second floating point operand indicates underflow, then the result produced is in the NaN format and contains floating point status information that is a coOmbination of the floating point status information encoded within the first floating point operand and underflow status information.

23. The floating point max/min circuit of claim 14, wherein if the format of the first floating point operand indicates NaN and the format of the second floating point operand indicates overflow, then the result produced is in the NaN format and contains floating point status information that is a combination of the floating point status information encoded within the first floating point operand and inexact status information.

24. The floating point max/min circuit of claim 14, wherein if the format of the first floating point operand indicates NaN and the format of the second floating point operand indicates underflow, then the result produced is in the NaN format and contains floating point status information that is a combination of the floating point status information encoded within the first floating point operand and inexact status information.

25. The floating point max/min circuit of claim 14, wherein if the format of the first floating point operand indicates NaN and the format of the second floating point operand indicates NaN, then the result produced is in the NaN format and contains floating point status information that is a combination of the flowing point status information encoded within the first floating point operand and the floating point status information encoded within the second floating point operand.

26. The floating point max/min circuit of claim 14, wherein if the format of the first floating point operand indicates infinity and the format of the second floating point operand indicates infinity, then the result produced contains floating point status information that is a combination of the floating point status information encoded within the first floating point operand and the floating point status information encoded within the second floating point operand.

27. The floating point max/min circuit of claim 14, wherein if the format of the first floating point operand indicates infinity and the format of the second floating point operand indicates overflow, then the result produced is a copy of the first floating point operand in the infinity format.

28. The floating point max/min circuit of claim 14, wherein if the format of the first floating point operand indicates infinity and the format of the second floating point operand indicates overflow, then the result produced is a copy of the first floating point operand in the infinity format.

* * * * *

UNITED STATES PATENT AND TRADEMARK OFFICE
CERTIFICATE OF CORRECTION

PATENT NO. : 7,228,324 B2  Page 1 of 1
APPLICATION NO. : 10/035746
DATED : June 5, 2007
INVENTOR(S) : Guy L. Steele, Jr.

It is certified that error appears in the above-identified patent and that said Letters Patent is hereby corrected as shown below:

In claim 3, column 20, lines 30-31, "underfiow," should read --underflow,--.

In claim 8, column 21, line 16, "non-a-number" should read --not-a-number--.

In claim 10, column 21, line 25, "max(-x,-y)—min(x,y)" should read --max(-x,-y) = -min(x,y)--.

In claim 10, column 21, line 29, "min(-x,-y)—max (x,y)" should read --min(-x,-y) = -max(x,y)--.

In claim 11, column 21, line 37, "(NaN0," should read --(NaN),--.

In claim 17, column 22, line 8, "underfiow" should read --underflow--.

In claim 17, column 22, line 10, "underfiow" should read --underflow--.

In claim 22, column 22, line 52, "coOmbination" should read --combination--.

In claim 22, column 22, line 54, "underfiow" should read --underflow--.

In claim 25, column 23, line 9, "flowing" should read --floating--.

Signed and Sealed this

Thirty-first Day of July, 2007

JON W. DUDAS
*Director of the United States Patent and Trademark Office*